United States Patent [19]
Drop, Sr.

[11] Patent Number: 5,826,906
[45] Date of Patent: Oct. 27, 1998

[54] TRUCK BED SAFETY SEATBELT

[76] Inventor: Mark Steven Drop, Sr., P.O. Box 2941, Covina, Calif. 91722

[21] Appl. No.: 812,444

[22] Filed: Mar. 6, 1997

Related U.S. Application Data

[63] Continuation-in-part of Ser. No. 546,985, Oct. 23, 1995, abandoned.

[51] Int. Cl.$^6$ .................................................. B60R 22/00
[52] U.S. Cl. ........................................................ 280/801.1
[58] Field of Search ...................... 280/801.1; 297/468, 297/464, 488; 296/68.1, 39.1, 39.2; 119/770, 771

[56] References Cited

U.S. PATENT DOCUMENTS

| | | | |
|---|---|---|---|
| 4,595,618 | 6/1986 | Caringer | 280/801.1 |
| 4,619,468 | 10/1986 | Spill | 297/488 |
| 4,706,992 | 11/1987 | Downing et al. | 280/801.1 |
| 4,911,493 | 3/1990 | Muirhead | 296/39.2 |

*Primary Examiner*—Eric D. Culbreth
*Attorney, Agent, or Firm*—Steins & Associates

[57] ABSTRACT

A Truck Bed Safety Seatbelt is described. The revealed system may be configurable for a variety of different truck beds and seating arrangements, including provisions for 1, 2, 3 or more passengers, and seating within mini-pickups, full-sized pickups and flat bed trucks, among others. As revealed, the present invention will provide passenger restraints in the truck bed, while preserving the cargo-carrying purpose of the bed. Further revealed is a system that will allow for the installation of a pickup truck bed toolbox, while still providing seating restraints for passengers. A optional cushion is revealed to provide increased seating comfort to the passengers.

20 Claims, 5 Drawing Sheets

TRUCK BED SAFETY SEATBELT

BACKGROUND OF THE INVENTION

This application is a continuation-in-part of U.S. application Ser. No. 08/546,985, filed Oct. 23, 1995, now abandoned.

1. Field of the Invention

This invention relates generally to vehicle passenger restraining systems, and, more specifically, to Truck Bed Safety Seatbelt.

2. Description of Related Art

Passenger restraint systems have been in existence and available in vehicle seating areas for nearly as long as motor vehicles. A standard design for such restraint systems includes at least a lap belt, made from a pliable, yet strong material, such as nylon mesh. This lap belt reaches around the waist area of the passenger and attaches to another belt section via a quick-release connection. The length of the lap belt is typically adjustable in order to enable the restraint of a variety of different waist sizes.

As stated above, these prior restraint systems have been available for the seating areas in motor vehicles for a long time. They have not, however, been as available for non-traditional seating areas, such as the beds of pickup trucks. Pickup trucks are widely used in the construction industry, among many, many others. It is common in such environments for more than three workers to require transportation around the job site, for distances greater than those that can conveniently be covered by walking. Since most, if not all States' laws require that any passengers in the bed of an open-backed truck be tethered to the vehicle, the bed of a pickup has been unusable for carrying passengers. As a result, multiple vehicles must be used to drive workers around the job site, even though the beds of the vehicles are virtually unused. A system that provided seating restraints for passengers in the bed of a open-backed utility vehicle, such as a pickup truck, would be very helpful in this regard.

Furthermore, the seating restraint system should not require any significant modification to the truck bed, such as apparatus that occupies any substantial volume. In such a manner, the cargo-carrying purpose of the truck bed will be preserved, while also enabling passengers to ride in the bed when desired.

It would also be helpful if the seating restraint system was configurable to a variety of vehicles, including mini-pickups, full-sized pickups and flat-bed trucks. The system should also be configurable for 1, 2, 3, or more passengers, depending upon a particular application or working environment. Furthermore, the system should be configurable to permit an installed truck-bed tool box to be attached to the bed, while still permitting passengers to be restrained within the bed.

SUMMARY OF THE INVENTION

In light of the aforementioned problems associated with the prior devices, it is an object of the present invention to provide a Truck Bed Safety Seatbelt. The system may be configurable for a variety of different truck beds and seating arrangements, including provisions for 1, 2, 3 or more passengers, and seating within mini-pickups, full-sized pickups and flat bed trucks, among others. The present invention will provide seating restraints while occupying a minimum of cargo area, such that the cargo-carrying purpose of the vehicle is preserved. One embodiment of the present invention may allow for the installation of a pickup truck bed toolbox, while still providing seating restraints for passengers. A cushion may be included to provide increased seating comfort to the passengers.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Truck Bed Safety Seatbelt.

Figure 1:
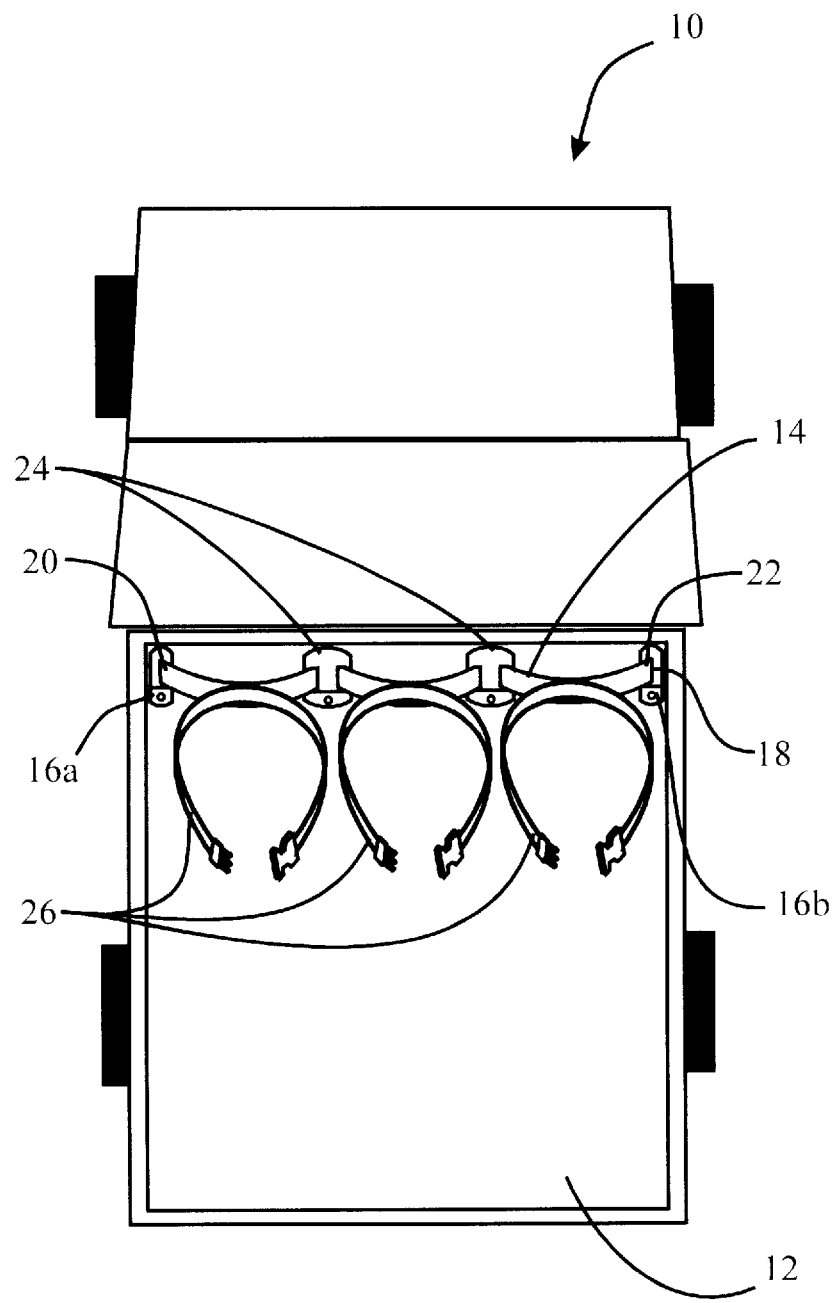
FIG. 1 is a top view of the present invention as installable in the bed of a full-sized pickup truck.

The present invention may best be appreciated by initial consideration of FIG. 1. The truck 10 shown has a bed 12, within which one embodiment of the present invention is installed. The present invention may also be installable in other sizes and types of vehicles that include a substantially flat, open rear area.

As shown, a main strap 14 may extend from a corner mounting bracket 16a to another corner mounting bracket 16b, such that it reaches over substantially the entire width of the bed 12. The main strap may be constructed from any well-known flexible, yet durable material, such as heavy-duty, nylon webbing.

At the corner mounting brackets, 16b, for example, the main strap 14 may be attached by threading it through a strap aperture 18, for example. The main strap 14 may then be re-attached to itself, such as with triple-stitched sewing, whereby a first loop 20 and second loop 22 are formed. In such a manner, the main strap 14 will be stretched and held between the corner mounting brackets 16a and 16b, respectively. Further detail corner mounting brackets 16a and 16b and their mounting to the bed 12 is provided below in connection with FIGS. 4 and 6.

A plurality of center mounting brackets 24 may be installed between the corner mounting brackets 16a and 16b, through which the main strap 14 may pass, thereby providing mid-span restraint for the main strap 14. Further detail regarding the center mounting brackets 24 and their mounting to the bed 12 is provided below in connection with FIGS. 5 and 6.

A plurality of securing straps 26 may be attached to the main strap 14, such that each securing strap 26 provides a passenger seating position with restraint. Each of the securing straps 26 is attached to the main strap 14 substantially mid-way between either center mounting brackets 24, or a corner mounting bracket 16a and the next center mounting bracket 24, for example. As with the main strap 14, the securing straps 26 may be constructed from any well-known material that is flexible, yet durable, such as heavy-duty nylon webbing. The design detail of having each seating position bracketed by a pair of mounting brackets, 16a and 24, for example is a critical aspect of the present invention. Further detail regarding the securing straps 26 is provided below in connection with FIG. 7.

As shown in FIG. 1, the present invention permits 3 passengers to be restrained within the bed 12 of a truck 10, while preserving a substantial portion of the cargo-carrying purpose of the bed 12. In fact, once the passengers have debarked, virtually the entire length of the bed 12 is available for cargo-carrying, without the need for removal of the restraint system.

Figure 2:
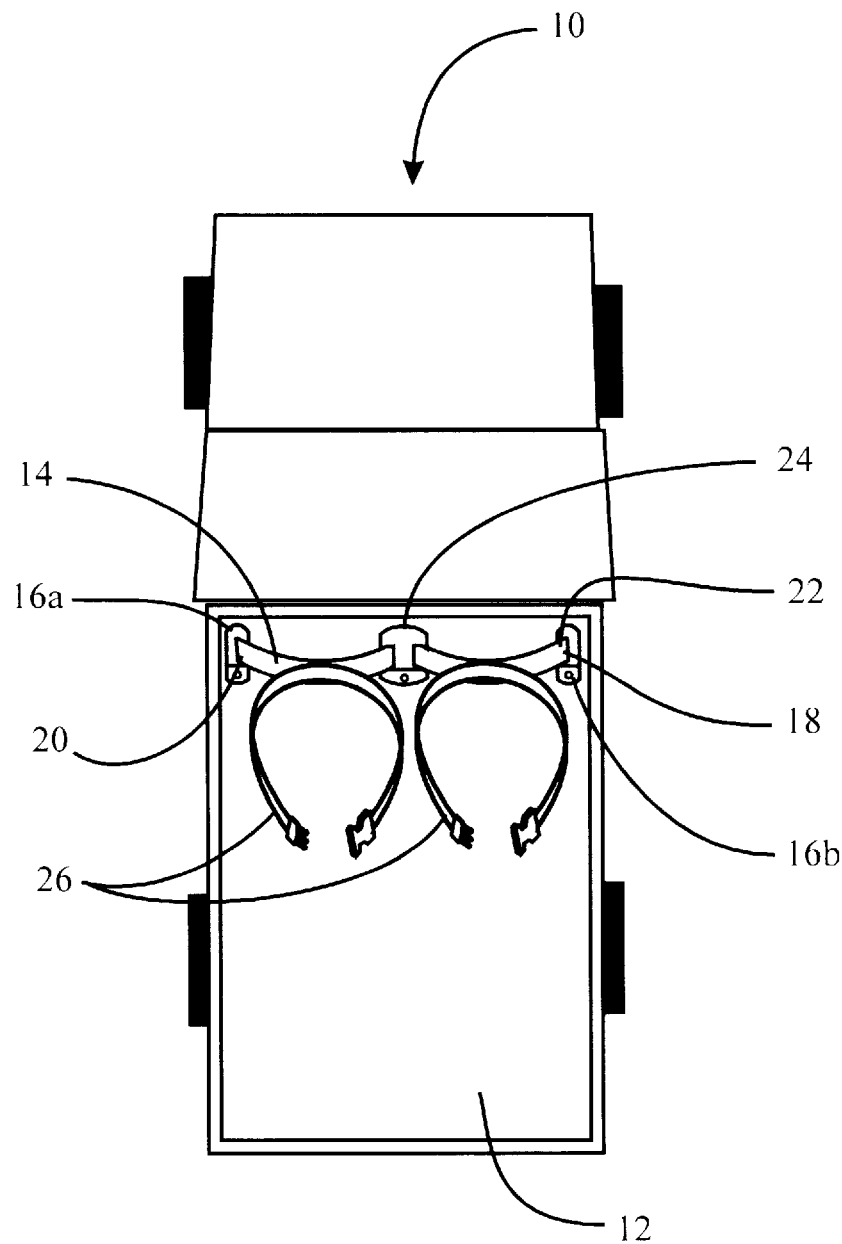
FIG. 2 is a top view of another preferred embodiment of the present invention as installable in the bed of a mini-pickup.

Turning now to FIG. 2, one may appreciate a preferred installation of the present invention in a mini-pickup, or other truck where only two seating positions are desirable. As shown, the truck 10, having a bed 12, with a main strap 14 extending from a corner mounting bracket 16a to another corner mounting bracket 16b. At each corner mounting bracket, 16b, for example, the main strap 14 passes through a strap aperture 18, and is reattached to itself, such that a first loop 20 and a second loop 22 is created. In the embodiment depicted in FIG. 2, there is but a single center mounting bracket 24, through which the main strap 14 passes. Midway between the center mounting bracket 24 and each of the corner mounting brackets 16a and 16b, are attached a plurality of securing straps 26, such that a plurality of seating positions is created. The materials of construction of all components is as described above in connection with FIG. 1.

Although not depicted, one can appreciate that a single seating position may be created through the use of only two corner mounting brackets, 16a and 16b, and a single securing strap attached midway therebetween to a main strap 14.

Figure 3:
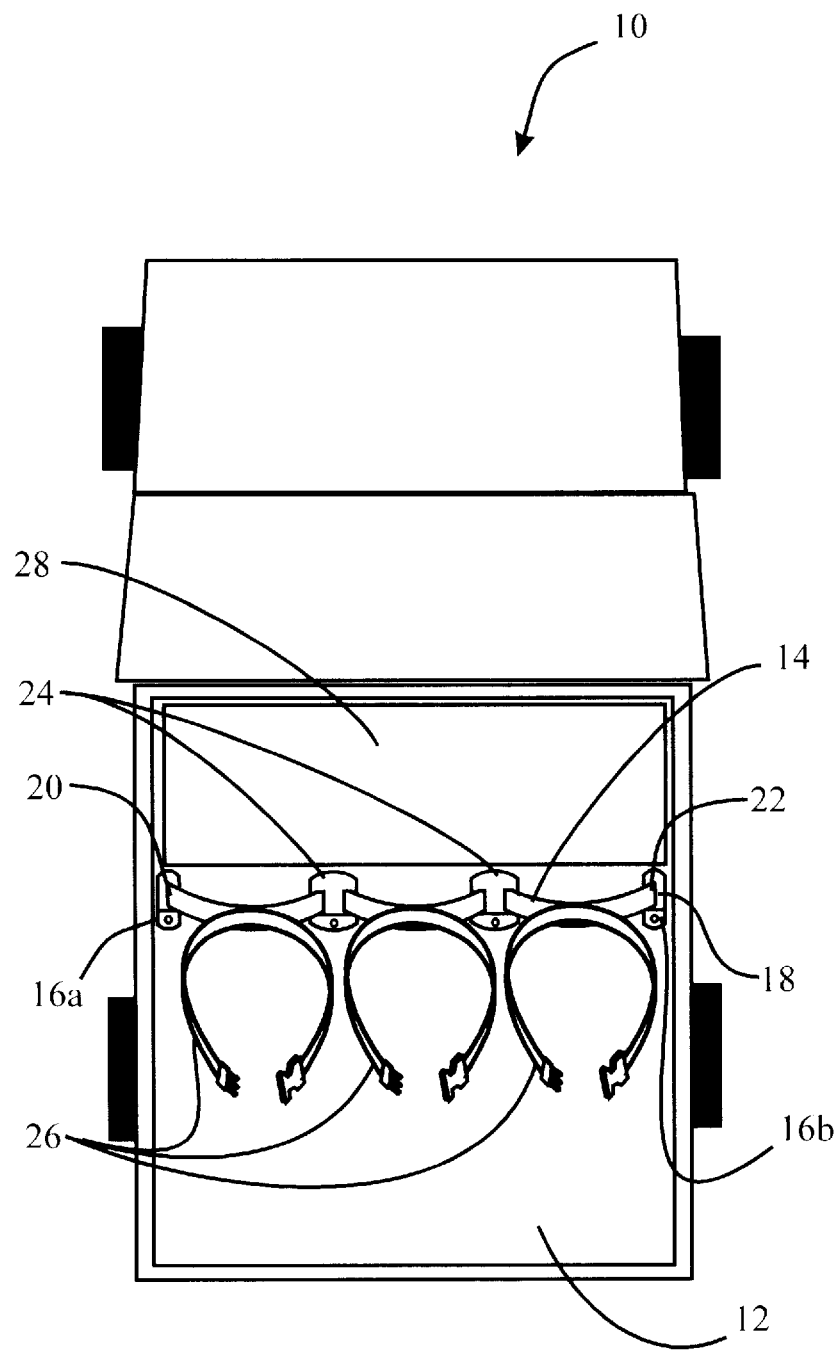
FIG. 3 is a top view of the present invention as installable in the bed of a full-sized pickup truck that also includes an installed tool box.

FIG. 3 depicts still another example of the installation of the present invention. As shown, the truck 10 has a bed 12, within which a tool box 28 is installed. A typical tool box 28 is permanently installed in the bed 12, such that substantially less area is available for open carrying. In such a situation, the present invention is installable by moving the corner mounting brackets 16a and 16b, and the central or center mounting brackets 24 back from the front of the front of the bed 12, to just behind the tool box 28. In such a manner, the main strap 14, is installable via the first loop 20 and second loop 22 to strap apertures, 18, for example. The securing straps 26 may then be attached to the main strap 14 in the same manner as described above in connection with FIGS. 1 and 2.

Figure 4:
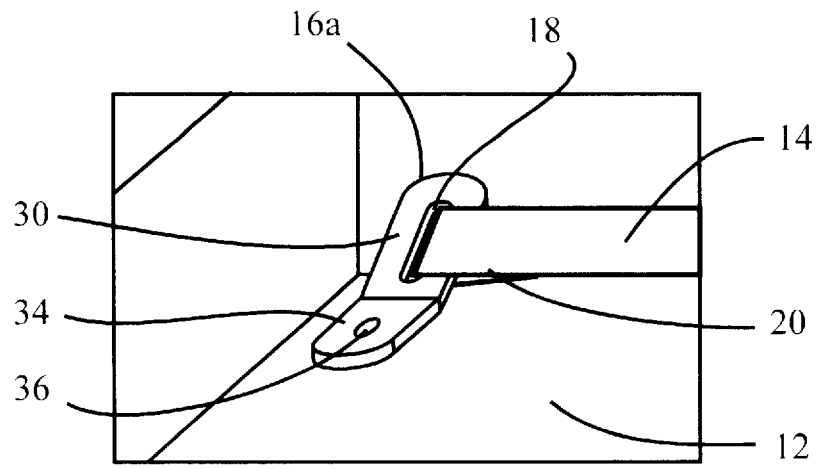
FIG. 4 is a partial perspective view of one embodiment of a preferred corner mounting bracket as it might be installed in the bed of a truck.

FIG. 4 provides additional detail regarding the construction of a corner mounting bracket, 16a, for example, and the attachment of the main strap 14 to it. As shown, a preferred corner mounting bracket 16a may comprise an upwardly-angled portion 30, within which the strap aperture 18 is located. Extending from the upwardly-angled portion 30 is a lower portion 34, within which an attaching means 36 is located for attaching the corner mounting bracket 16a, for example, to the bed 12. The corner mounting bracket, 16a, for example may be constructed from any well-known strong, substantially rigid and ideally corrosion-resistant material, such as stainless steel or other treated metal.

As further shown in FIG. 4, the main strap 14 is attached to the corner mounting bracket 16a, for example, by threading it through the strap aperture 18 and back to be attached to itself, such as by triple-stitching, whereby a first loop 20 is created.

Figure 5:
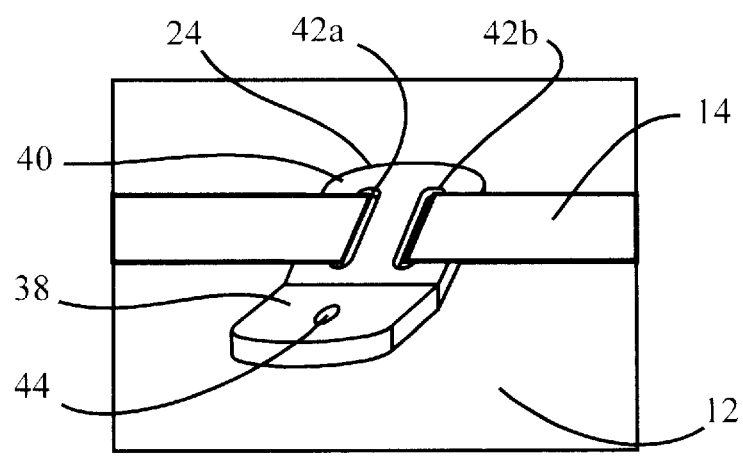
FIG. 5 is a partial perspective view of one embodiment of a preferred center mounting bracket as it might be installed in the bed of a truck.

FIG. 5 provides additional detail regarding the design of the central or center mounting brackets 24. As shown, a preferred central or center mounting bracket 24 comprises a lower portion 38, from which extends an upwardly-angled portion 40 within which center or apertures 42a and 42b are located. It is possible that more, or fewer central or center apertures 42a, for example, may be included, depending upon the particular application involved.

An attaching means 44, for attaching the center mounting bracket 24 to the bed 12, is located on the lower portion 38. Further detail regarding the attaching means 44 is provided below in connection with FIG. 6. As further shown, the main strap 14 passes through one center aperture 42a, from front to back, and then through another center aperture 42b, from back to front. In such a manner, a very inexpensive and durable attachment is created between the main strap 14 and the center mounting bracket 24. The materials of construction of the center mounting bracket 24 are, like the corner mounting brackets (see FIG. 4), any well-known strong, substantially rigid material.

Figure 6:
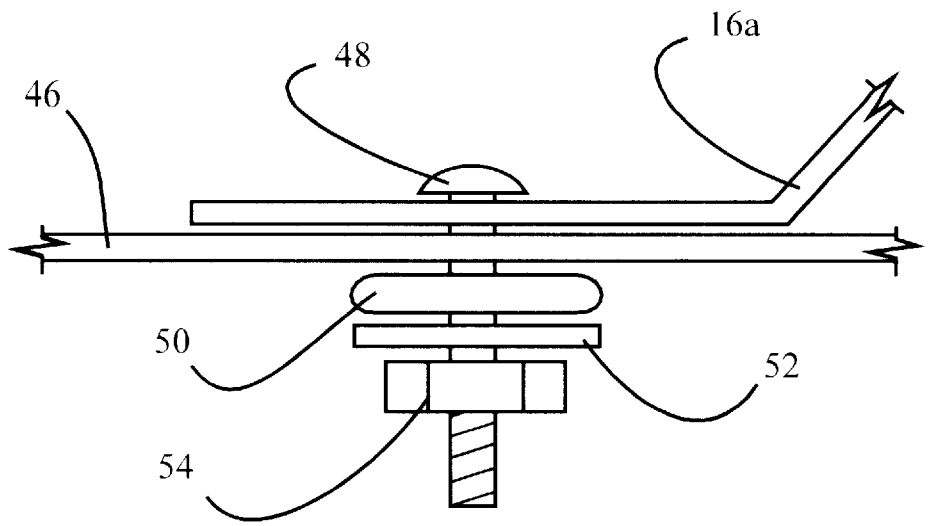
FIG. 6 is a partial cutaway side view of a preferred means for attaching a corner mounting bracket to the bottom of the bed of a truck.

FIG. 6 depicts a preferred installation of a corner mounting bracket 16a to the floor 46 of the bed (see FIG. 1). The attaching means (see FIG. 4) may comprise an anchor bolt 48, extending through an aperture (not shown) within the corner mounting bracket 16a and through the bed floor 46. It is very likely that there will be an existing aperture through the bed floor 46 that the anchor bolt 48 can be put through; in such a manner, no additional apertures will need to be added by the person installing the present system. The anchor bolt 48 may be any well-known bolt, that is strong and preferably corrosion-resistant. Below the bed floor 46, fitted over the anchor bolt 48 is a grommet 50, such as from rubber or plastic, to provide vibration-dampening. Next, a washer 52 is located on the anchor bolt 48 to provide a hard surface against which the nut 54 can be torqued. The depicted assembly is simply one possible representation; other similar arrangements are possible, such that a long-lasting, durable attaching means is provided.

Figure 7:
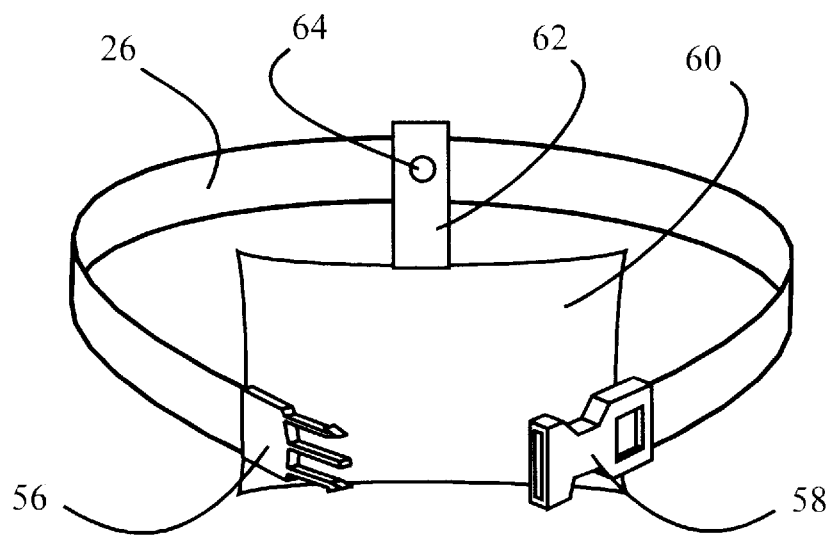
FIG. 7 is a partial perspective view of a preferred securing strap assembly, including a preferred cushion installation.

If we now consider FIG. 7, the details of the securing strap 26 and assembly can be better understood. As shown, each securing strap 26 may terminate at opposing ends in a first closure half 56 and a second closure half 58. The first closure half 56 and second closure half 58 are releasibly attachable to one another to provide the actual restraint around the passenger's waist, and may be configured in any well-known arrangement currently used in vehicle seat belts, such as that shown, which is formed from plastic and includes a sliding attachment to the securing strap; one must simply pull on the "tails" of the securing strap 26 to tighten the fit of the restraint.

An optional aspect of the present invention is a seat cushion 60, which is attachable at each securing strap 26. In a preferred form, the cushion 60 will lay substantially flat on the bed (not shown) and will be attached to the securing strap 26, main strap (not shown) or even the front of the bed (not shown) by an attaching strap 62 extending from the cushion 60, which includes an attachment means 64. The attachment means 64 may be "VELCRO" fasteners, snaps, or other well-known releasable attachment method. The cushion 60 may be any conventional cushioning assembly, such as a soft core surrounded by a durable, yet pliable cover, such as vinyl.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. In a truck having a bed apparatus for securing passengers to, said bed further having a bottom, comprising:

at least two corner mounting brackets attached to said bed;

at least one central mounting bracket attached to said bed, between said corner brackets;

a main strap, having a first end attached to one of said at least two corner mounting brackets, a middle portion attached to at least one of said central mounting brackets, and a second end attached to another of said at least two corner mounting brackets; and at least one securing strap, each having a first end attachable to a second end and a middle portion attached to said main strap.

2. The apparatus of claim 1, wherein:

each of said corner mounting brackets further includes at least one strap aperture;

said main strap is made from a flexible, yet durable material and further includes a first loop formed at said first end and a second loop formed at said second end; and said first loop and said second loop pass through one of said strap apertures of a corresponding said corner mounting bracket.

3. The apparatus of claim 2, wherein said corner mounting brackets are substantially rigid and further comprise:

a base portion having a mounting aperture; and an upwardly-angled portion extending from said base portion and further including said strap aperture.

4. The apparatus of claim 3 wherein each said central mounting bracket is further defined by at least one central aperture through which said middle portion of said main strap passes.

5. The apparatus of claim 4, wherein each said central mounting bracket is substantially rigid and further comprises:

a base portion having a mounting aperture; and an upwardly-angled portion extending from said base portion and whereon said at least one central aperture is located.

6. The apparatus of claim 5, wherein said at least one securing strap further comprises:

a first fastening assembly attached to said first end; and a second fastening assembly attached to said second end and releasably attachable to said first fastening assembly.

7. The apparatus of claim 6, further comprising at least one cushion resting on said bottom of said bed adjacent to said middle portion of each of said at least one securing straps.

8. The apparatus of Claim 7, wherein one of said at least one cushions is attached to each of the middle portions of each of said at least one securing straps.

9. The apparatus of claim 8, wherein said first fastening assembly is slidingly attached to said at least one securing strap.

10. The apparatus of claim 8, wherein said second fastening assembly is slidingly attached to said at least one securing strap.

11. In a truck having a bed a safety seatbelt system for securing passengers to said bed, said bed further having a bottom, comprising:

at least two corner mounting brackets attached to said bed;

at least one central mounting bracket attached to said bed, between said corner brackets;

a main strap, having a first end attached to one of said at least two corner mounting brackets, a middle portion attached to at least one of said central mounting brackets, and a second end attached to another of said at least two corner mounting brackets; and at least one securing strap, each having a first end attachable to a second end and a middle portion attached to said main strap.

12. The system of claim 11, wherein:

each of said corner mounting brackets is substantially rigid and further comprises a base portion having a mounting aperture and an upwardly-angled portion extending from said base portion and further including a strap aperture;

said main strap is made form a flexible, yet durable material and further includes a first loop formed at said first end and a second loop formed at said second end, said first loop and said second loop pass through one of said strap apertures of a corresponding said corner mounting bracket.

13. The system of claim 12, wherein each said central mounting bracket is substantially rigid and further comprises:

a base portion having a mounting aperture; and an upwardly-angled portion extending from said base portion and whereon said at least one central aperture is located, said central aperture being where through said middle portion of said main strap passes.

14. The system of claim 13, wherein said at least one securing strap further comprises:

a first fastening assembly slidingly attached to said first end; and a second fastening assembly slidingly attached to said second end and releasably attachable to said first fastening assembly.

15. The system of claim 14, further comprising at least one cushion resting on said bottom of said bed, wherein each of said at least one cushions is adjacent to each of the middle portions of each of said at least one securing straps.

16. The system of claim 15, wherein one of said at least one cushions is attached to each of the middle portions of each of said at least one securing straps.

17. In a truck having a bed a safety seatbelt apparatus for securing passengers to said bed, said bed further having a bottom, comprising:

at least two corner mounting brackets attached to said bed;

at least one central mounting bracket attached to said bed, between said corner brackets;

a main strap, having a first end attached to one of said at least two corner mounting brackets, a middle portion attached to at least one of said central mounting brackets, and a second end attached to another of said at least two corner mounting brackets; and at least one securing strap, each having a first end further including a first fastening assembly, a second end further including a second fastening assembly and a middle portion attached to said main strap whereby said first fastening assembly is attachable to said second fastening assembly for securing one of said passengers.

18. The apparatus of claim 17, wherein:

each of said corner mounting brackets is substantially rigid and further comprises a base portion having a mounting aperture and an upwardly-angled portion extending from said base portion and further including a strap aperture; and said main strap is made from a flexible, yet durable material and further includes a first loop formed at said first end and a second loop formed at said second end, and said first loop and said second loop pass through one of said strap apertures of a corresponding said corner mounting bracket.

19. The apparatus of claim 18, wherein each said central mounting bracket is substantially rigid and further comprises:

a base portion having a mounting aperture; and an upwardly-angled portion extending from said base portion and further including at least one central aperture through which said middle portion of said main strap passes.

20. The apparatus of Claim 19, further comprising at least one cushion, each said cushion being attached to each of the middle potions of each of said at least one securing straps and resting on said bottom of said bed.

* * * * *